R. F. HUNTER.
KNUCKLE.
APPLICATION FILED APR. 11, 1911.

1,132,348.

Patented Mar. 16, 1915.

Witnesses
Edna W. Thomas
Charles Richardson

Inventor
Robert F. Hunter.
By Wm. C. McIntire
Attorney

UNITED STATES PATENT OFFICE.

ROBERT FRANKLIN HUNTER, OF BELLEFONTE, PENNSYLVANIA.

KNUCKLE.

1,132,348.  Specification of Letters Patent.  Patented Mar. 16, 1915.

Application filed April 11, 1911. Serial No. 620,444.

*To all whom it may concern:*

Be it known that I, ROBERT F. HUNTER, a citizen of the United States, residing at Bellefonte, in the county of Center and State of Pennsylvania, have invented certain new and useful Improvements in Knuckles; and I do hereby declare the following to be a full, clear, and exact description of the invention, such as will enable others skilled in the art to which it appertains to make and use the same.

This invention relates to new and useful improvements in knuckles, and more particularly to the self-lubricating class to be used in connection with the steering mechanism of automobiles or the like, rocker arms for engines, bearings for transmission of power, and being especially useful in the many clevis or knuckle bearings for harvesting machinery, shaft or tongue clips for horse-drawn vehicles, high grade hinges, universal joints in power transmission, agricultural implements, etc.

An object of this invention is to improve and simplify devices of this character, rendering them comparatively simple and inexpensive to manufacture, reliable and efficient in use, readily operated, and providing against lost motion incident to the wearing of any of the parts.

With the above and other objects in view, this invention resides in the novel features of construction, formations, combinations and arrangements of parts to be hereinafter more fully described, claimed and illustrated in the accompanying drawings, in which—

Figure 1:
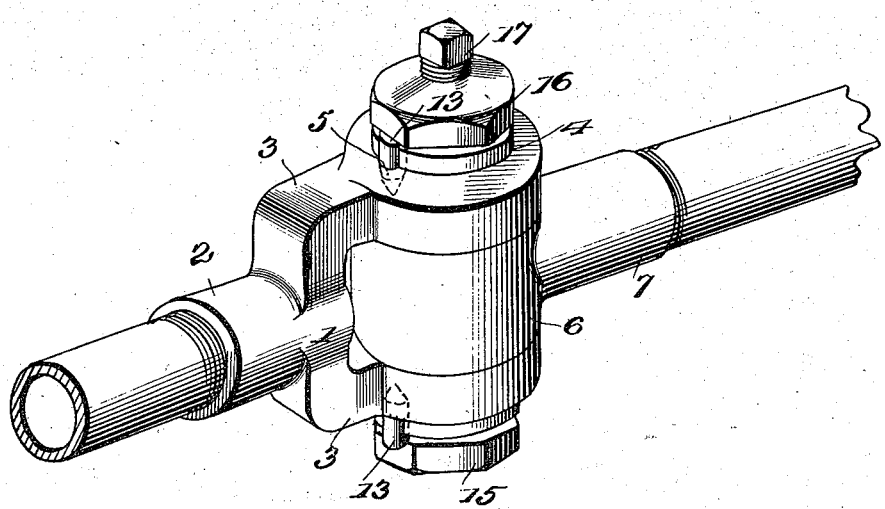
Figure 2:
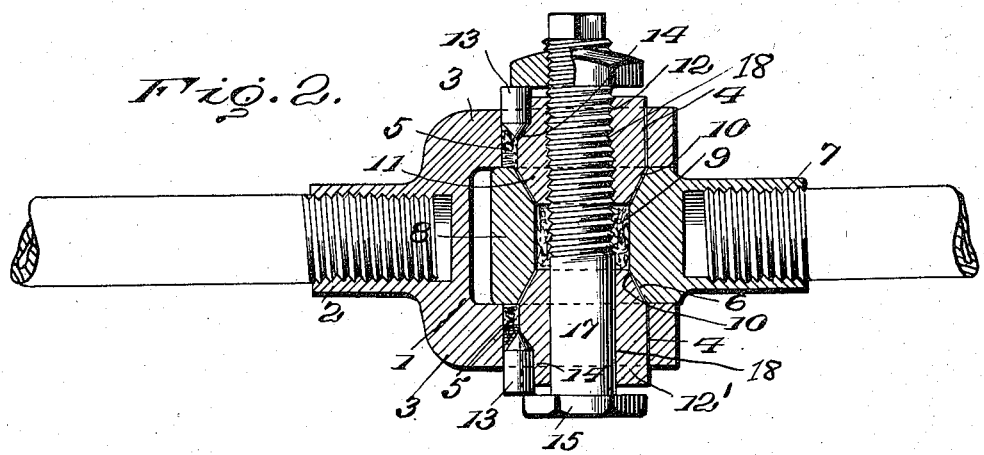
Figure 3:
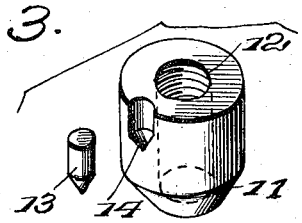

Figure 1 is a perspective view of my improved knuckle; Fig. 2 is a vertical sectional view thereof; and Fig. 3 is a detail perspective view of one of the bearing cones with its locking pin removed.

Referring to the drawing by characters of reference, the numeral 1 designates generally a clevis, consisting of an internally threaded rod-receiving socket 2, upon the forward end of which are formed overlying arms 3, provided with centrally disposed alining circular apertures 4, formed at one side thereof with offset semi-circular key-engaging recesses 5, which extend the entire length of the said apertures 4.

A center member 6 is held between the terminals of the arms 3, and has formed thereon an extension 7. This extension 7 is provided at one side thereof with an enlarged head 8 having located therein a vertically disposed opening 9, provided with outwardly flared conical-shaped ends 10, adapted to receive the tapered inner extremities 11 of upper and lower bearing cones 12 and 12', which are held against rotation within the circular apertures 4 by conical-shaped or pointed locking pins 13 seated within the before-mentioned semicircular recesses 5, and similar conical-shaped recesses 14 formed in the sides of the cones 12. These recesses 14 terminate at points substantially intermediate the length of the cones, and always hold the upper ends of the pins 13 slightly above the edges of the said cones, whereby they will at all times be forced downwardly through the recesses 5 and 14 by the head 15 and locking nut 16 located at the opposite ends of a connecting bolt 17, which extends through the opening 9 of the center member and through openings 18 formed in the bearing cones 12 and 12'. When the locking nut 16 is screwed down on to the connecting bolt 17 as heretofore stated, it will be apparent that the tapered ends of the pins 13 by engaging the conical-shaped recesses 14 in the bearing cones 12 and 12' operate to securely lock said bearing cones in the openings 4 in the arms 3 by increasing the diameter of the bearing surface on a line extending through the centers of said pins 13 and through the centers of the cones 12 and 12'.

The bearing cone 12' is slidable upon the bolt 17, while the bearing cone 12 is threaded thereon, which permits the adjustment of said cones 12 and 12'.

It will be noted that the opening 9 is considerably larger than the opening 18, which permits of the inward adjustment of the cones 12 and 12' in case they become worn, by the rotation of the bolt 17, which serves to force the cones 12 and 12' inwardly by their threaded sliding engagement with the said bolt, in which position the cones may be securely held against displacement by the nut 16, which locks the bolt against rotation.

The space 9 between the bolt 17, cones 12 and 12' and inner periphery of the center member 6 may be filled with grease or the like, which obviously may be fed to all parts of the knuckle upon movement of the center member.

The previous disclosures illustrated one embodiment of my invention, but it is to be understood that minor changes in the details of construction, formations, combinations and arrangements of the various parts may be resorted to within the scope of the appended claim without sacrificing any advantages of the invention.

Having thus fully described this invention, what I claim as new and desire to protect by Letters Patent is:

A knuckle comprising a clevis having a pair of arms provided with alined openings and transverse semi-circular grooves offset from said openings, a center member extending between said arms and provided with a cylindrical bore in registry with the openings in said arms, said bore terminating in flared extremities, a pair of oppositely directed cylindrical members having cone-shaped ends coöperating with the flared openings in said center member and located in the alined openings in said arms, each of said cylindrical members being provided with a semi-circular cone-shaped groove extending to substantially the center of the cylindrical member and upon the periphery thereof and adapted for registry with one of the transverse grooves in the arms, tapered pins mounted in said grooves, and extending beyond the outer surfaces of said cylindrical members, a bolt of less diameter than the bore of said center member passing through said cylindrical members and said center member and providing a free space for the reception of a lubricant, a head on one end of said bolt, the other end of said bolt being threaded, and a locking nut mounted on said threaded end of the bolt, the head on said bolt and said locking nut adapted to engage the tapered pins to move them toward one another when the locking nut is screwed on to the bolt to increase the diameter of the bearing surfaces of said cylindrical members and said pins.

In testimony whereof I affix my signature in presence of two witnesses.

ROBT. FRANKLIN HUNTER.

Witnesses:
LOTTIE ROBB,
W. HARRISON WALKER.